Nov. 14, 1933.   R. F. KRAUSE   1,935,094

COFFEE CONTAINER

Filed Sept. 21, 1931

R. F. Krause
INVENTOR

BY Frease and Bishop
ATTORNEYS

Patented Nov. 14, 1933

1,935,094

UNITED STATES PATENT OFFICE 1,935,094

COFFEE CONTAINER

Richard F. Krause, Massillon, Ohio

Application September 21, 1931
Serial No. 564,069

3 Claims. (Cl. 220—46)

The invention relates to containers or canisters for holding coffee and the like, and more particularly to a substantially air-tight container especially adapted for home use for keeping coffee in fresh condition after it has been removed from the original container or package.

It is well known that the coffee bean contains certain oils essential to the production of good quality coffee beverage. When the coffee bean is broken or crushed, as by grinding, these oils may be quickly extracted from the roasted and ground coffee by bringing the same into contact with boiling water.

However, it has been found that once the coffee bean is broken, or crushed, these oils will quickly become rancid, due to chemical change or decomposition caused by contact with the air, thus making the ground coffee practically worthless for producing coffee beverage. Once the coffee beans are broken or crushed they should be kept out of contact with the air in order that the oils will remain in their original fresh condition so as to impart the aroma to the coffee.

The object of the present improvement is to provide a substantially air-tight container for holding ground coffee and keeping it fresh, so that the oils therein will remain sweet and fresh until the coffee is removed from the container for producing coffee beverage.

The above and other objects may be attained by providing a container having a rolled rim at its upper, open end, and a cover for said container provided with a rim channel in which is located a ring of flexible rubber or the like, adapted to contact with said rim flange, and to be compressed against the same by clamping means in order to form a substantially air-tight joint between the container and cover.

Figure 1:
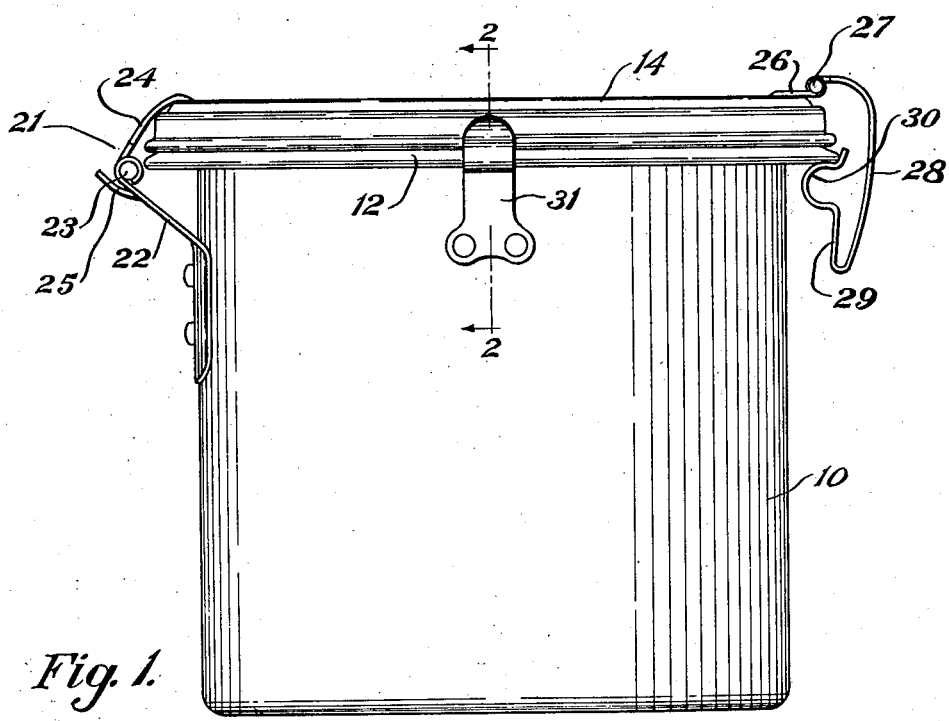
Figure 2:
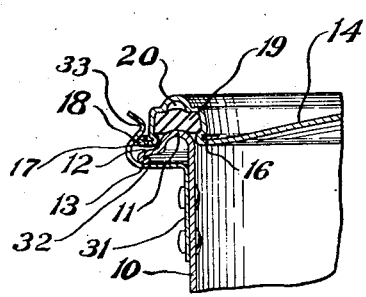

An embodiment of the invention thus set forth in general terms is illustrated in the accompanying drawing, in which Figure 1 is a side elevation of the improved coffee container to which the invention pertains;

Fig. 2, a fragmentary section on the line 2—2, Fig. 1; and

Figure 3:
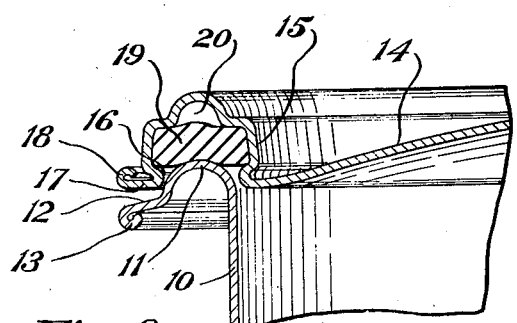

Fig. 3, an enlarged section through the rim portion of the container and the channel rim of the cover, showing the compressible ring therein.

Similar numerals refer to similar parts throughout the drawing.

The container, which is illustrated generally at 10, may be of cylindric form, and of such size as to hold any desired amount of ground coffee ready for use.

The upper open end of the container may be provided with a rolled rim 11 terminating in a downwardly inclined, peripheral flange 12 provided at its edge with a strengthening bead 13.

This container, as well as the cover, shown generally at 14, may be formed of aluminum or other sheet material. The cover may be provided around its outer edge with the inverted rim channel 15 preferably slightly restricted at its lower side as at 16 and terminating in the peripheral flange 17 having a bead 18 for strengthening the same.

A compressible ring 19, of rubber or other suitable material, is located within the rim channel 15 of the cover for contact with the rolled rim 11 of the receptacle. In order to impart sufficient flexibility to the action of the ring 19 to permit the same to be compressed so as to tightly fit around the rolled rim 11 of the receptacle, the rim channel 15 of the cover may be provided upon the upper side of the ring 19, with a central recess 20 of sufficient depth that the ring 19 will not seat therein when compressed, as best shown in Fig. 3.

The cover 14 is preferably connected to one side of the container as by the hinge 21 which may comprise the angular leaf 22, attached to the side wall of the container and hingedly connected, as by the pin 23, to the leaf 24 carried by the cover, a lug 25 protruding from the leaf 22 and adapted to be engaged by the leaf 24 to support the cover in open position.

In order to tightly clamp the cover upon the container, so as to compress the rubber ring 19 around the rim roll 11 and form an air-tight joint between the container and cover, clamping means may be provided diametrically opposite to the hinge above described.

This may be in the form of a clamp as shown in Fig. 1, comprising a bracket portion 26 attached to the cover and having hingedly connected thereto, as at 27, a depending clamping member 28 provided with the upturned end 29 terminating in the curved spring portion 30 for engagement beneath the bead 13 of the container.

To assist in tightly holding the cover upon the container, spring clips 31 may be connected to the container at equally spaced points between the hinge and clamp, each of these spring clips having an offset portion 32 extending beyond the bead 13 and terminating in an upturned curved spring portion 33 for engagement over the bead 18 of the cover.

With this construction it will be seen that a container or canister is provided for storing ground coffee for household use, the coffee being sealed substantially air-tight within the container so as to maintain the same in its original fresh condition, preventing chemical change or decomposition of the essential oils in the coffee whereby coffee beverage of excellent quality and aroma may be extracted therefrom.

I claim:

1. A coffee container having a rim at its upper, open end, a cover for the container having a rim channel therein integral with the cover, a compressible ring in said rim channel adapted to contact with said rim, said rim channel having a central recess above said compressible ring, the recess being of sufficient depth that the ring will not seat therein when compressed and means for clamping the cover upon the container to compress said ring.

2. A coffee container having a rolled rim at its upper, open end, a cover for the container having a rim channel therein integral with the cover, a compressible ring in said rim channel adapted to contact with said rim, said rim channel having a central recess above said compressible ring, the recess being of sufficient depth that the ring will not seat therein when compressed and means for clamping the cover upon the container to compress said ring.

3. A coffee container having a rolled rim at its upper, open end, a cover for the container having a rim channel therein, said channel being restricted at its lower side, a compressible ring within the channel above the restricted portion thereof, the rolled rim being adapted to be received within the restricted portion of the channel, and means for clamping the cover upon the container to compress the ring, said rim channel having a central recess above said compressible ring, the recess being of sufficient depth that the ring will not seat therein when compressed.

RICHARD F. KRAUSE.